US 6,619,416 B2

(12) United States Patent
Lan

(10) Patent No.: US 6,619,416 B2
(45) Date of Patent: Sep. 16, 2003

(54) BRAKE LEVER-CONTROLLED POWER SCOOTER CONTROL SYSTEM

(76) Inventor: Mey-Chu Lan, 7F, No.6, Lane 20, Sec.4, San Ho Rd., San-Chung City, Taipei Hsien (TW)

(*) Notice: Subject to any disclaimer, the term of this patent is extended or adjusted under 35 U.S.C. 154(b) by 0 days.

(21) Appl. No.: 09/863,581

(22) Filed: May 21, 2001

(65) Prior Publication Data

US 2002/0134604 A1 Sep. 26, 2002

(30) Foreign Application Priority Data

Mar. 23, 2001 (TW) ..................... 90204506 U

(51) Int. Cl.⁷ ................. B62D 51/02; B62D 61/02
(52) U.S. Cl. ............... 180/181; 180/220; 180/65.1
(58) Field of Search ............. 280/37.01, 37.041, 280/37.042; 180/65.1, 220, 221, 180, 181, 205, 206, 207, 65.8, 208; 318/560

(56) References Cited

U.S. PATENT DOCUMENTS

| 4,168,758 A | * | 9/1979 | Holt ..................... 180/206 |
| 5,505,277 A | * | 4/1996 | Suganuma et al. ......... 180/206 |
| 5,819,867 A | * | 10/1998 | Matsumoto et al. ........ 180/206 |
| 5,848,660 A | * | 12/1998 | McGreen ................. 180/206 |
| 5,894,898 A | * | 4/1999 | Catto ................... 180/181 |
| 6,155,369 A | * | 12/2000 | Whittaker ............... 180/205 |
| 6,342,769 B1 | * | 1/2002 | Birkestrand et al. ...... 180/205 |
| 2002/0029919 A1 | * | 3/2002 | Patmont et al. .......... 180/220 |
| 2002/0088660 A1 | * | 7/2002 | Wong ................... 180/220 |
| 2002/0117341 A1 | * | 8/2002 | Lan .................... 180/181 |

FOREIGN PATENT DOCUMENTS

GB 2290508 * 1/1996

* cited by examiner

Primary Examiner—Anne Marie Boehler

(57) ABSTRACT

A brake lever-controlled power scooter control system includes a control unit electrically connected between the battery and motor of the power scooter and adapted to control the operation of the motor subject to the moving speed of the power scooter, and switch means electrically connected between the control unit and the motor of the power scooter coupled to the brake lever of the power scooter to close the circuit between the control unit and the motor of the power scooter when the brake lever is released, or to open the circuit between the control unit and the motor of the power scooter when the brake lever is depressed.

2 Claims, 5 Drawing Sheets

BRAKE LEVER-CONTROLLED POWER SCOOTER CONTROL SYSTEM

BACKGROUND OF THE INVENTION

The present invent relates to a power scooter and, more specifically, to a brake lever-controlled power scooter control system, which controls the operation of the motor of the power scooter subject to the moving speed of the power scooter and the position of the brake lever.

A regular power scooter, as shown in FIG. 1, comprises a motor A, a belt transmission mechanism coupled between the output shaft of the motor A and the rear wheels C, and a front brake E controlled by a brake lever to stop the front wheel F from rotation. This structure of power scooter has numerous drawbacks as outlined hereinafter.

1. Because battery power supply is constantly maintained connected to the motor A after the power scooter has been started or during the movement of the power scooter, much battery energy is wasted when the power scooter is temporarily stopped or the speed of the power scooter is reduced.
2. Because the motor A keeps consuming battery power after started the power scooter, much battery energy is wasted when operating the front brake E to reduce the speed of the power scooter.
3. Because the motor A is connected to a control unit, which controls the operation of the motor A, it receives a load from the control unit when the user moves the power scooter after the motor A has been turned off, and the user must employ much effort to move the power scooter.
4. When the motor A is rotated after power off, a reverse potential may be produced to damage the control unit.

SUMMARY OF THE INVENTION

The present invention has been accomplished to provide a brake lever-controlled power scooter control system, which eliminates the aforesaid drawbacks. According to the present invention, the brake lever-controlled power scooter control system comprises a control unit electrically connected between the battery and motor of the power scooter and adapted to control the operation of the motor subject to the moving speed of the power scooter, and switch means electrically connected between the control unit and the motor of the power scooter coupled to the brake lever of the power scooter to close the circuit between the control unit and the motor of the power scooter when the brake lever is released, or to open the circuit between the control unit and the motor of the power scooter when the brake lever is depressed. When the user presses the brake lever to reduce the moving speed of the power scooter, the switch is switched off to cut off power supply from the motor, preventing waste of power energy. When the user moves the power scooter after the motor has been turned off, the user can press the brake lever to a mid position to cut off the circuit between the motor and the control unit, prohibiting the control unit from a reverse potential damage.

DETAILED DESCRIPTION OF THE PREFERRED EMBODIMENT

Figure 1:
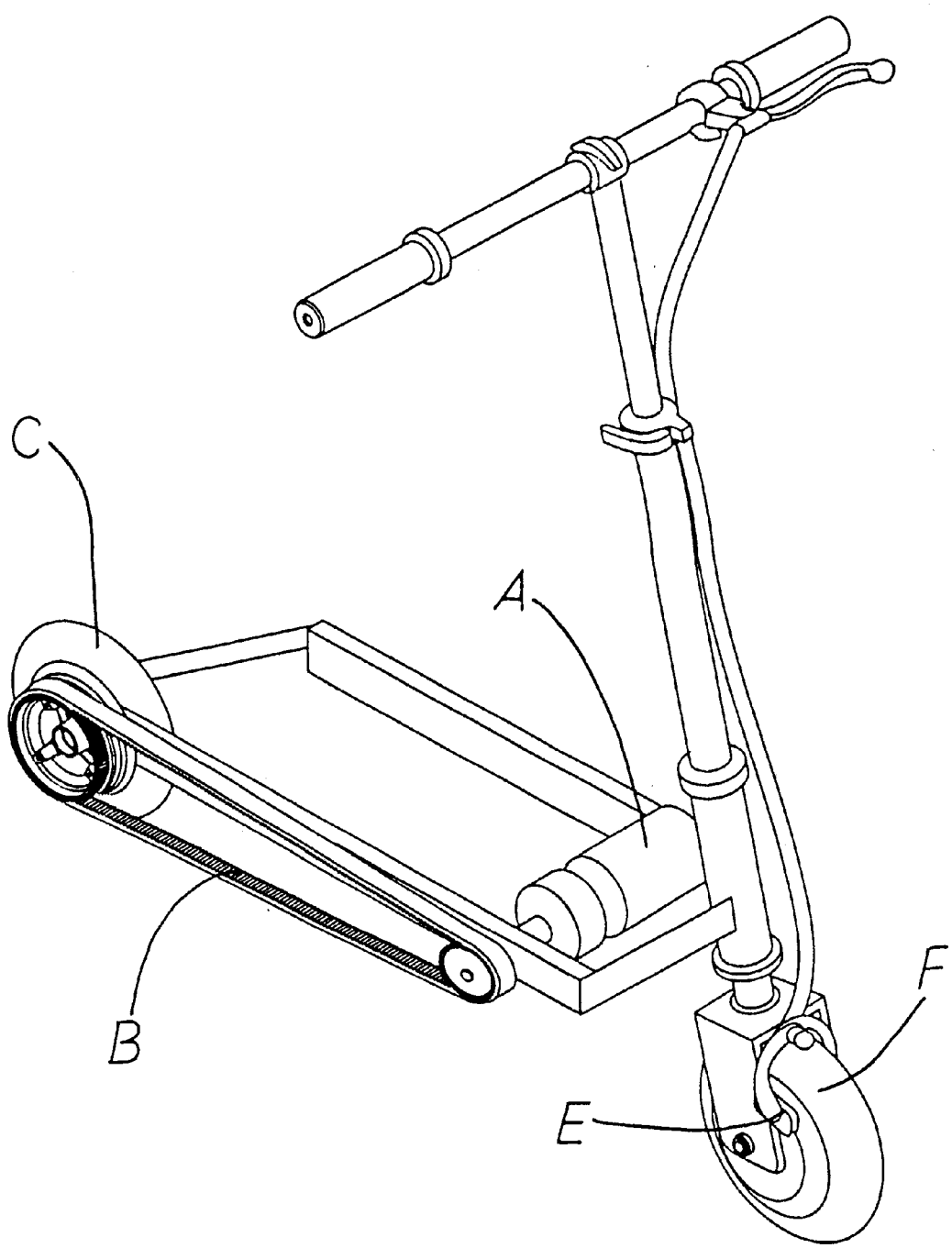
FIG. 1 illustrates a power scooter according to the prior art.
Figure 2:
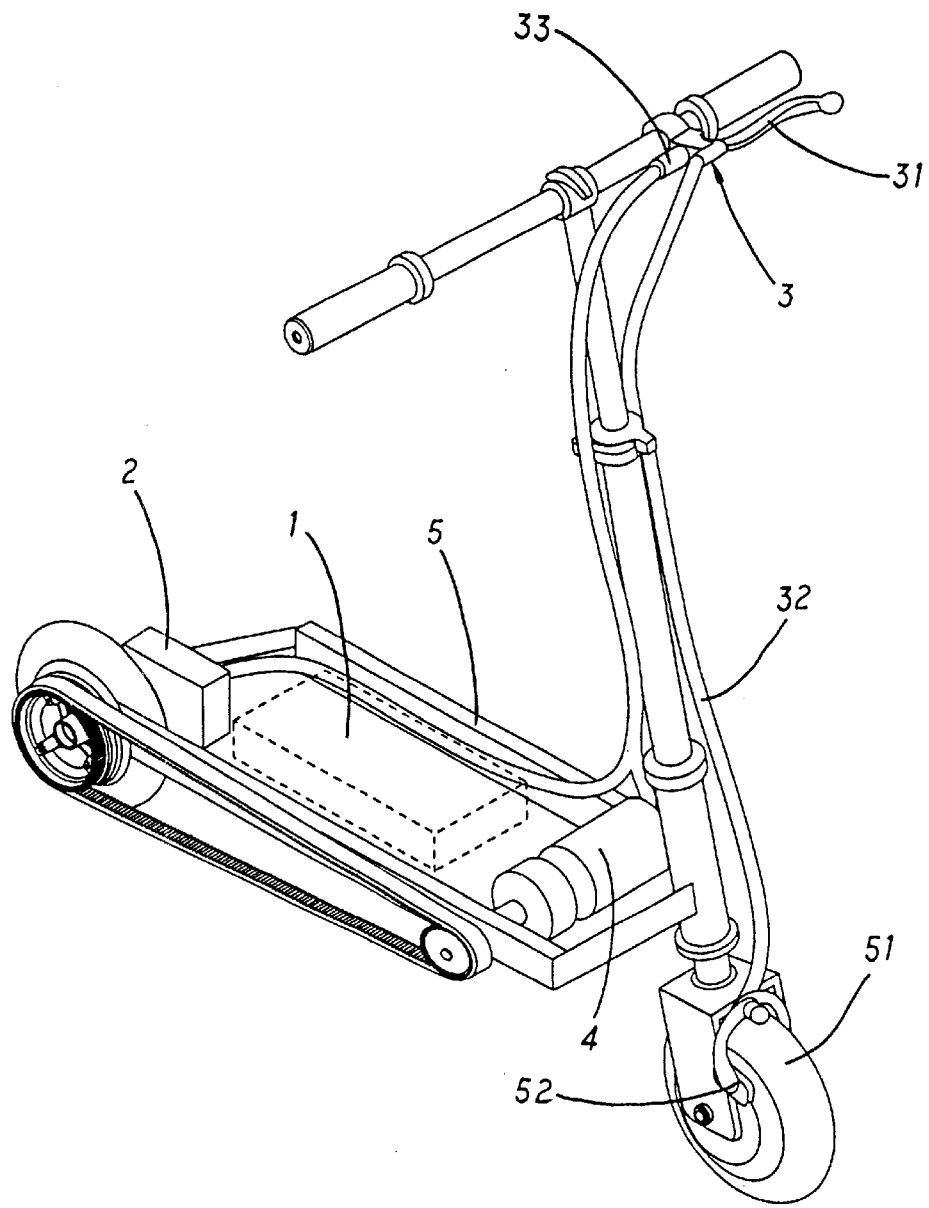
FIG. 2 illustrates a brake lever-controlled power scooter control system installed in a power scooter according to the present invention.
Figure 3:
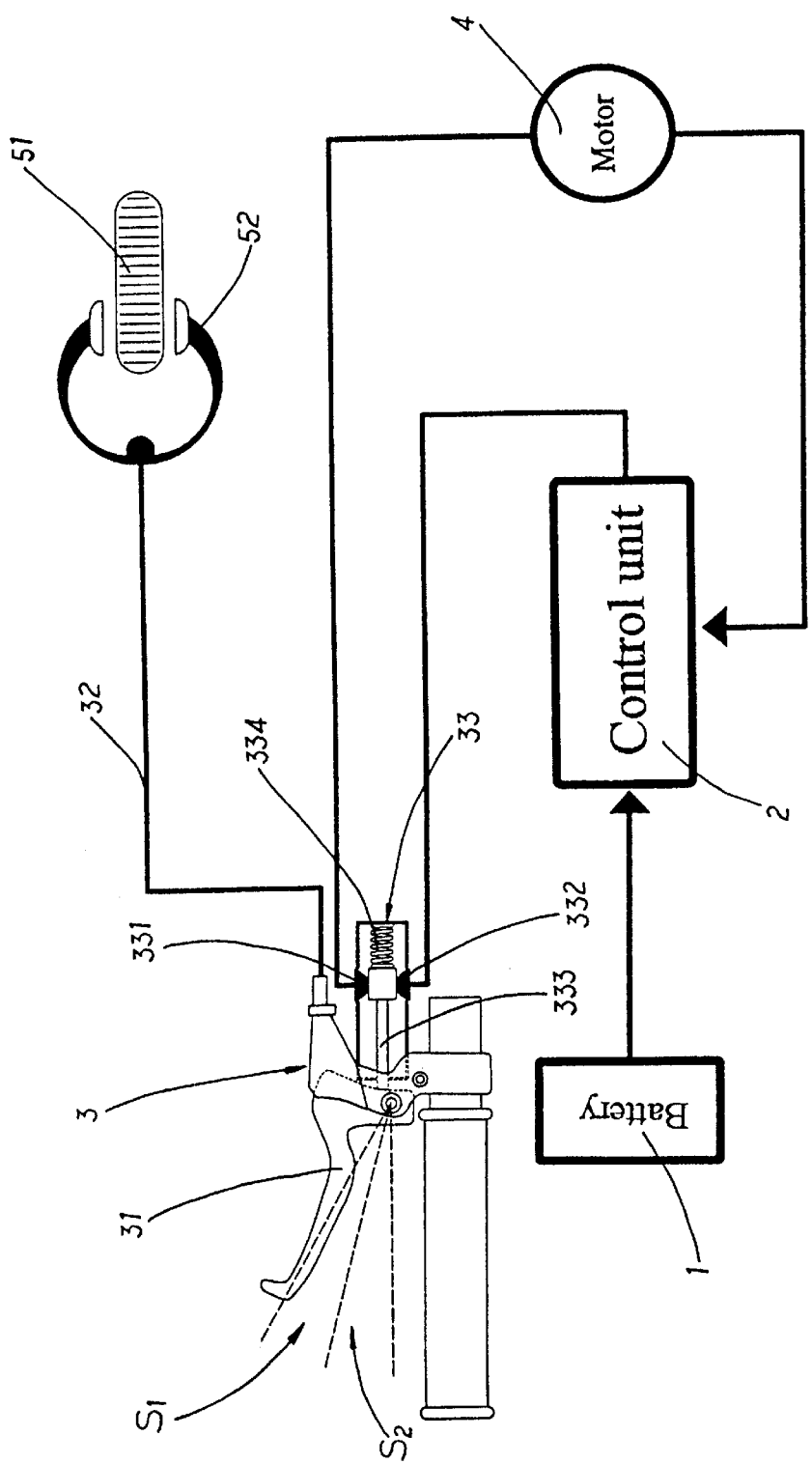
FIG. 3 is a circuit block diagram of the present invention.

Referring to FIGS. 2 and 3, a brake lever-controlled power scooter control system in accordance with the present invention is generally comprised of a battery 1, a control unit 2, a brake unit 3, and a motor 4. The control unit 2 is electrically connected between the battery 1 and the brake unit 3 to control the transmission of battery power supply from the battery 1 to the motor 4 through the brake unit 3 as well as the operation of the motor 4. When the user moves the power scooter and the moving speed of the power scooter reaches a predetermined level, the control unit 2 immediately turns on the motor 4 to move the scooter body 5. On the contrary, when the speed of the power scooter drops below a predetermined level, the control unit 2 immediately cuts off battery power from the motor 4.

The brake unit 3 comprises a brake lever 31 installed in the handlebar of the power scooter, a front brake 52 controlled to stop the front wheel 51 of the power scooter, a brake cable 32 connected between the brake lever 31 and the front brake 52, and a switch 33 electrically connected between the control unit 2 and the motor 4 and driven by the brake lever 31 to close/open the circuit between the control unit 2 and the motor 4. The switch 33 comprises a first contact 331 electrically connected to the motor 4, a second contact 332 electrically connected to the control unit 2, a spring 334, and a metal contact pin 333 pivoted to the brake lever 31 and supported on the spring 334. Normally, the contact pin 333 is disposed in contact with the contacts 331;332 to close the circuit, and the switch 33 is maintained in the "on" position. When operating the brake lever 31 to stop the power scooter, the contact pin 333 is forced away from the contacts 331;332 to open the circuit, and therefore the switch 33 is switched off.

Figure 4:
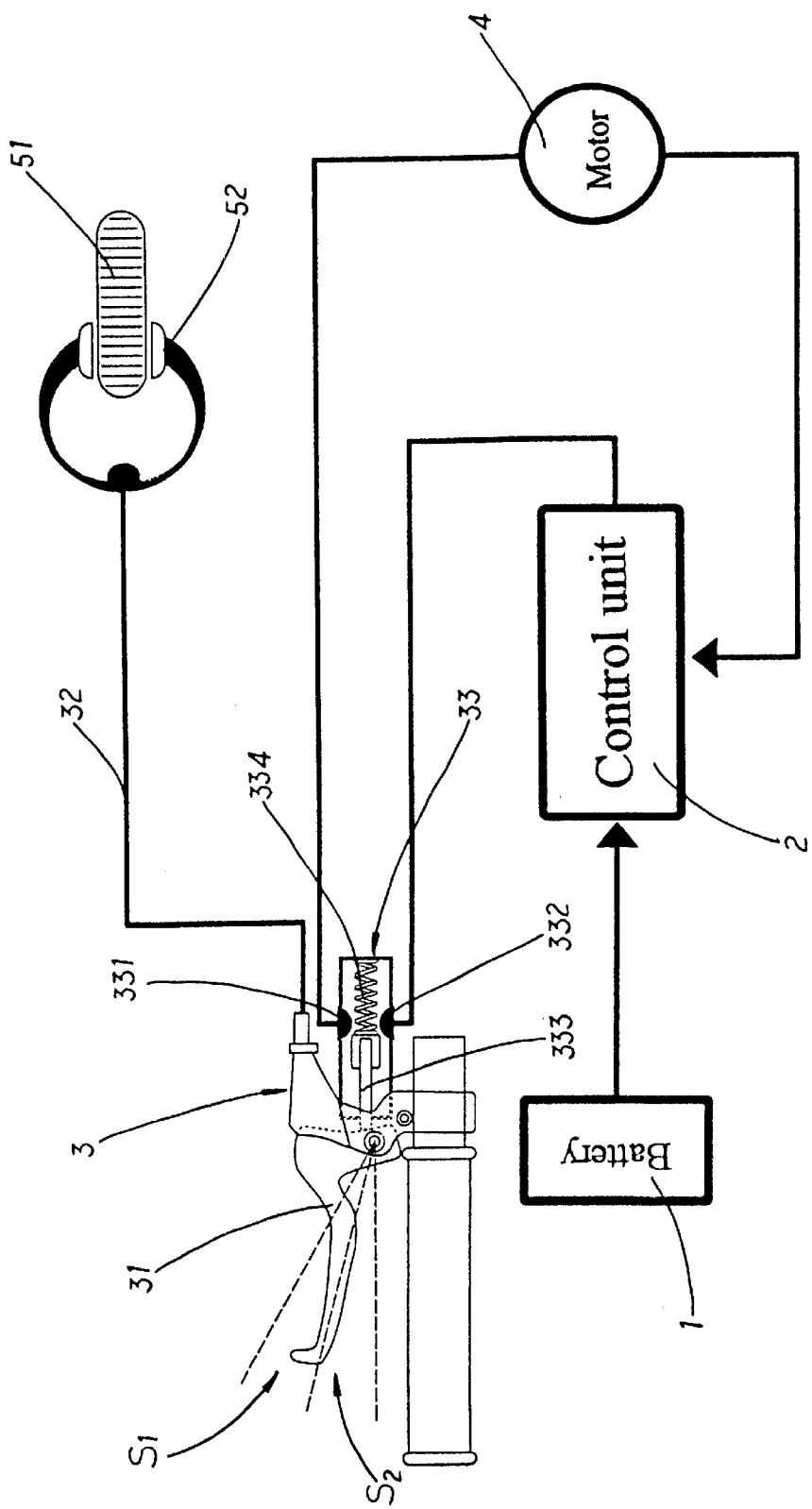
FIG. 4 is similar to FIG. 3 but showing the brake lever moved to the first stroke position, the switch switched off.
Figure 5:
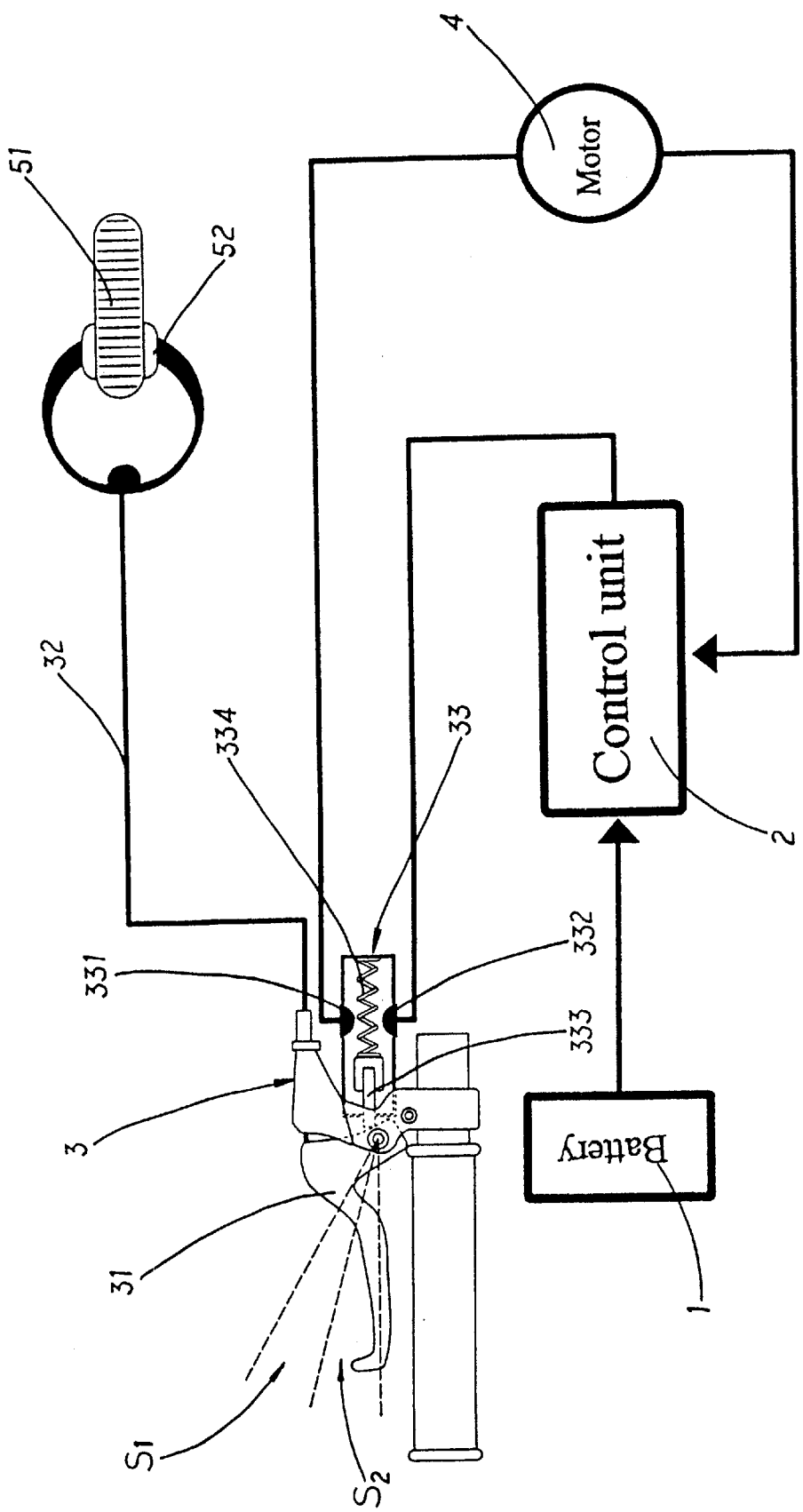
FIG. 5 is similar to FIG. 4 but showing the brake lever moved to the second stroke position, the switch switched off, the front brake clamped on-the front wheel.

Referring to FIGS. 4 and 5 and FIG. 3 again, when the user moves the scooter body 5 and the moving speed of the scooter body 5 reaches a predetermined level, the battery power is transmitted from the battery 1 through the control unit 2 and the switch 33 to the motor 4 (see FIG. 3). When the user pressing the brake lever 31 to a first stroke S1 to reduce the speed of the power scooter, the contact pin 33 is pulled away from the contacts 331;332 to open the circuit, and therefore the battery power is cut off from the motor 4 (see FIG. 4). At this stage, the front brake 52 does not completely stop the front wheel 51 from rotation, the scooter body 5 keeps moving due to inertia effect, and the motor 4 is freely rotated. When the user continuously pressing the brake lever 31 to the second stroke S2, the front brake 52 is pulled to stop the front wheel 51 from rotation, and the power scooter is stopped (see FIG. 5). On the contrary, when releasing the hand from the brake lever 31, the contact pin 333 is returned to contact the contacts 331;332, and therefore the switch 33 is switched on, and at this time the control unit 2 detects the moving speed of the power scooter, so as to start the motor 4 to move the scooter body 5 when the moving speed of the power scooter reaches the predetermined level.

A prototype of brake lever-controlled power scooter control system has been constructed with the features of FIGS. 2–5. The brake lever-controlled power scooter control system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A brake lever-controlled power scooter control system installed in a power scooter and connected between a battery and a motor of the power scooter and adapted to control the operation of the motor subject to the position of the brake lever of the power scooter and the moving speed of the power scooter, comprising a control unit electrically connected between the battery and the motor of the power scooter and adapted to detect the moving speed of the power scooter and to control the supply of battery power from the battery to the motor, and switch means electrically connected between said control unit and the motor of the power scooter and controlled by the brake lever of the power scooter to close/open the circuit between said control unit and the motor of the power scooter subject to the position of the brake lever of the power scooter, said switch means being switched on for enabling said control unit to provide battery power from the battery to the motor of the power scooter when the brake lever of the power scooter is released, said switch means being switched off to interrupt power supply from the battery to the motor of the power scooter when the brake lever of the power scooter is depressed; said switch means comprises a first contact electrically connected to the motor of the power scooter, a second contact electrically connected to said control unit and the battery of the power scooter, a metal contact pin coupled to the brake lever of the power scooter and supported on a spring and moved with the brake lever of the power scooter between a first position where the brake lever of the power scooter is released and said contact pin is disposed in contact with said first contact and said second contact to close the circuit between said control unit and the motor of the power scooter, and a second position where the brake lever of the power scooter is depressed and said contact pin is moved with the brake lever of the power scooter away from said first contact and said second contact to open the circuit between said control unit and the motor of the power scooter.

2. The brake lever-controlled power scooter control system of claim 1, wherein said control unit detects the moving speed of the power scooter, and turns on the motor of the power scooter when the moving speed of the power scooter reaches a predetermined level, or turns off the motor of the power scooter when the moving speed of the power scooter drops below the predetermined level.

* * * * *